United States Patent [19]
Bytzek et al.

[11] Patent Number: 5,139,463
[45] Date of Patent: Aug. 18, 1992

[54] SERPENTINE DRIVE WITH COIL SPRING ALTERNATOR CONNECTION

[75] Inventors: Klaus K. Bytzek, Schomberg; Jacek S. Komorowski, Bond Head, both of Canada

[73] Assignee: Litens Automotive Partnership, Woodbridge, Canada

[21] Appl. No.: 710,455

[22] Filed: Jun. 5, 1991

[51] Int. Cl.[5] .............................. F16H 7/00
[52] U.S. Cl. ...................... 474/69; 474/70
[58] Field of Search ............ 474/46, 69, 70, 101, 474/133, 135, 138, 166, 167, 174, 902, 903

[56] References Cited

U.S. PATENT DOCUMENTS

| | | | |
|---|---|---|---|
| 2,911,961 | 11/1959 | McRae | 474/70 X |
| 2,911,962 | 11/1959 | McRae | 474/70 X |
| 2,964,959 | 12/1960 | Beck et al. | 474/70 X |
| 3,048,056 | 8/1962 | Wolfram | 474/70 X |
| 3,618,730 | 11/1971 | Mould, III | 192/566 |
| 4,473,362 | 9/1984 | Thomey | 474/135 |

Primary Examiner—Thuy M. Bui
Attorney, Agent, or Firm—Cushman, Darby & Cushman

[57] ABSTRACT

A serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring is disposed in operative relation between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof.

11 Claims, 2 Drawing Sheets

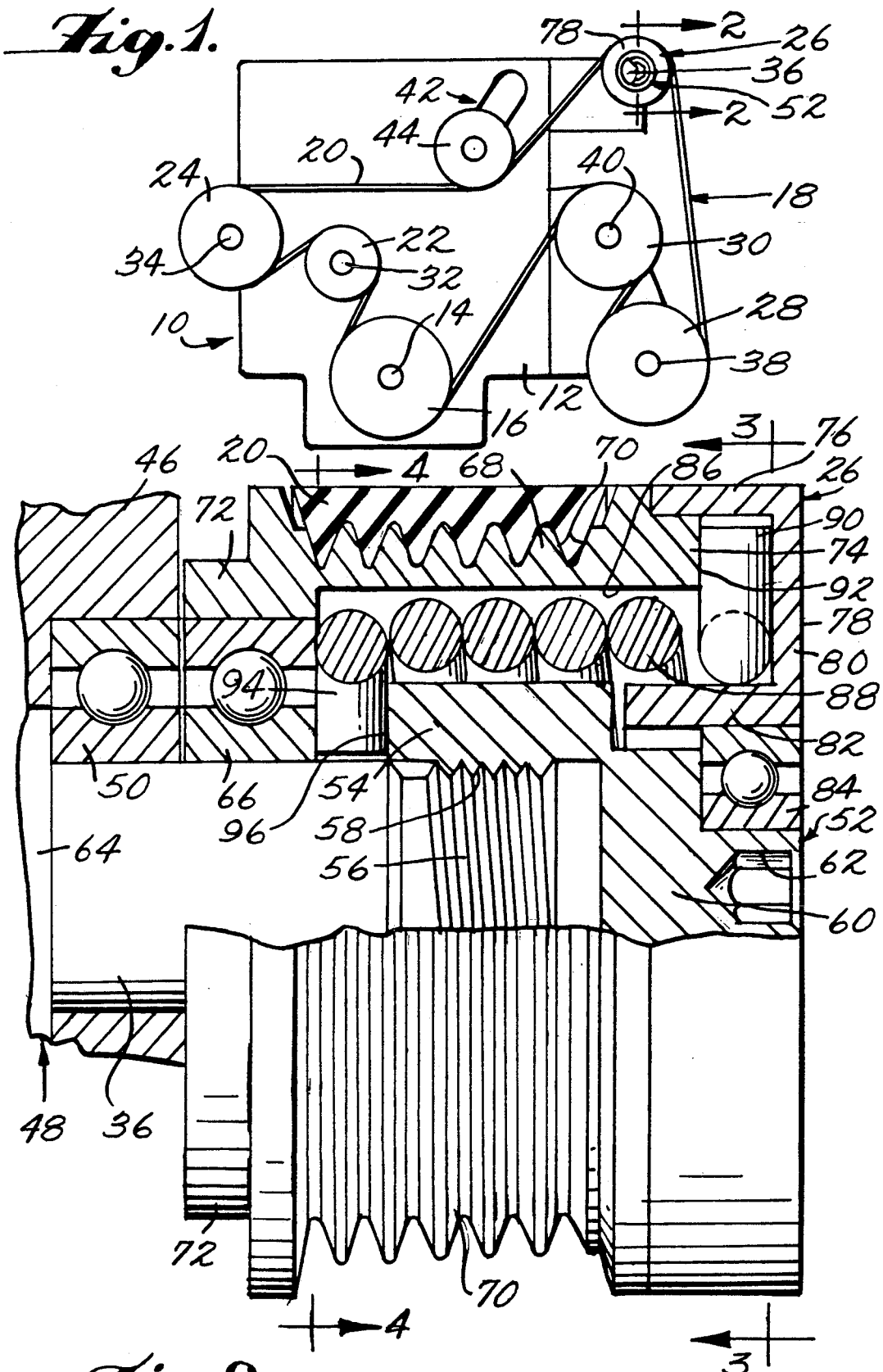

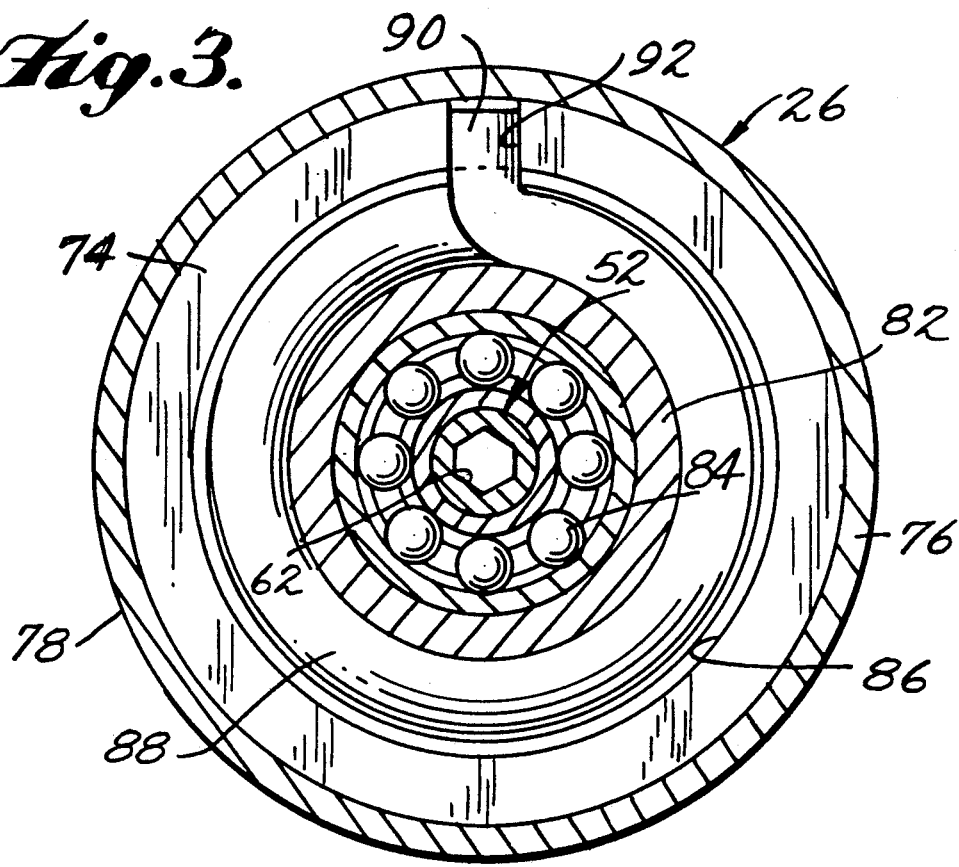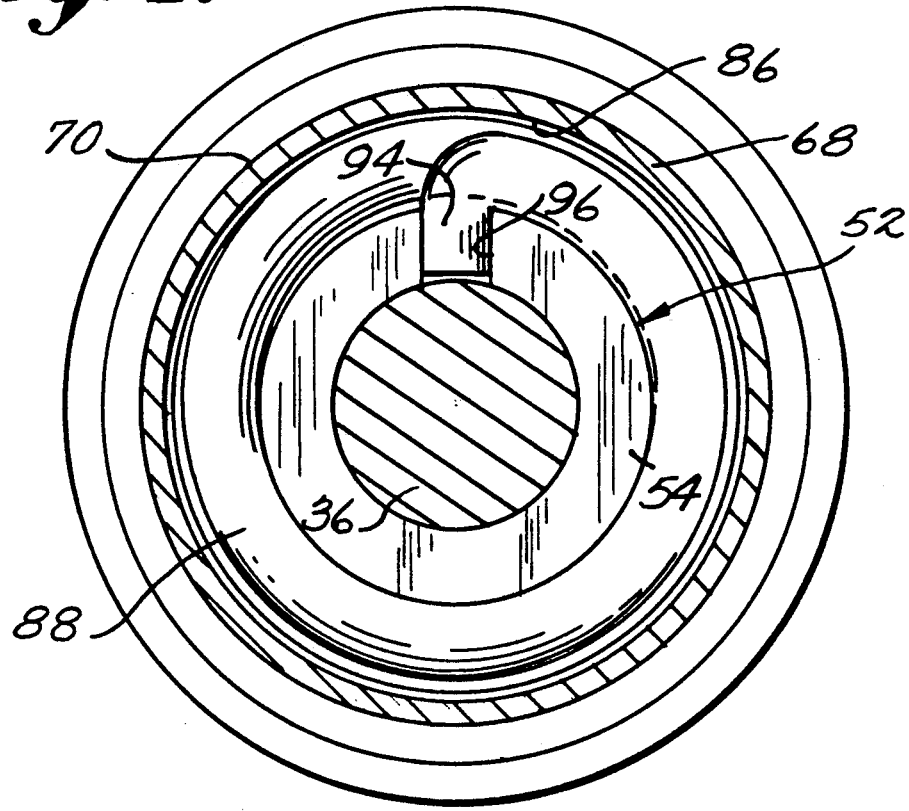

SERPENTINE DRIVE WITH COIL SPRING ALTERNATOR CONNECTION

This invention relates to drive systems and more particularly to serpentine accessory drive systems for automotive vehicles.

Serpentine accessory drive systems have come into increasing use in automotive vehicles. A typical serpentine drive system includes a driving pulley on the output shaft of the internal combustion engine of the vehicle, a series of driven pulleys for the accessories and a poly-V belt trained about the driving and driven pulleys. An advantage of the serpentine drive is that, by providing an automatic belt tensioner on the belt, the accessories can be fixedly mounted.

Particularly where the engine is of the four-cylinder type, the driving pulley establishes a highly dynamic loading on the belt. This high dynamic loading is due to the variable torque output characteristics of such engines. Under this circumstance, the tensioner cannot accommodate all of the variable torque characteristics. The result is sometimes noise and decreased belt life due to instantaneous belt slippage. It has been proposed to provide an engine crank shaft decoupler in order to deal with the high dynamic belt loading. This solution, while effective, is costly since the decoupler must have a capacity generally equal to the system capacity. A need exists for a more cost effective manner of accommodating the high dynamic belt loading to reduce noise and preserve belt life.

It is an object of the present invention to fulfill the need expressed above. The invention is based upon the principle that, because the alternator accessory presents the highest inertia to the system but requires only a portion of the total capacity of the system, cost effectiveness can be achieved by providing a decoupler function between the alternator armature and the alternator pulley. Accordingly, the objective can be obtained by providing a serpentine belt drive system for an automotive vehicle of the type which includes an internal combustion engine having an output shaft with a driving pulley fixed thereto and rotatable about an output shaft axis, a sequence of driven assemblies each having a driven pulley rotatable about an axis parallel with the output shaft axis and a serpentine belt mounted in cooperating relation with the driving pulley and with the driven pulleys in a sequence which corresponds with the sequence of the driven assemblies when related to the direction of movement of the belt to cause the driven pulleys to rotate in response to the rotation of the driving pulley. The sequence of driven assemblies includes an alternator assembly including a housing and an armature assembly mounted in the housing for rotation about an armature axis. A hub structure is carried by the armature assembly outwardly of the housing for rotation therewith about the armature axis, the pulley of the alternator assembly being mounted on the hub structure for rotational movement with respect to the hub structure about the armature axis. A coil spring is operatively mounted between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in either direction with respect to the alternator pulley during the driven rotational movement thereof.

Another object of the present invention is the provision of a drive system of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is a front elevational view of an automotive internal combustion engine having a serpentine drive system embodying the principles of the present invention connected therewith;

FIG. 2 is an enlarged fragmentary sectional view taken along the line 2—2 of FIG. 1;

FIG. 3 is a sectional view taken along the line 3—3 of FIG. 2; and

FIG. 4 is a sectional view taken along the line 4—4 of FIG. 2.

Referring now more particularly to drawings, there is shown in FIG. 1 an automotive internal combustion engine, generally indicated at 10, which includes a schematically indicated engine frame 12 and an output shaft 14. Fixed to the output shaft 14 is a driving pulley 16 forming a part of a serpentine drive system, generally indicated at 18. The drive system 18 includes an endless belt 20. The belt 20 is of the thin flexible type, as, for example, a poly-V belt. The belt 20 is trained about the driving pulley 16 and a sequence of driven pulleys 22, 24, 26, 28, and 30 each of which is fixed to respective shafts 32, 34, 36, 38, and 40. Except for the pulley 22, which is a simple idler pulley, the shafts are connected to operate various engine or vehicle accessories. For example, shaft 34 drives an engine water pump, shaft 36 an electrical alternator, shaft 38 an electromagnetic clutch of a compressor for an air-conditioning system for the automobile, and shaft 40 an oil pump of the power steering system.

It will be understood that the internal combustion engine 10 may be of any known construction. In accordance with conventional practice, the operation of the engine is such as to impart vibratory forces to the engine frame 12. All of the accessories are mounted on the engine frame 12 so that the shafts are rotated about parallel axes which are fixed with respect to the engine frame 12 and parallel with the output shaft 16 thereof. The belt 20 is tensioned by a belt tensioner, generally indicated at 42. The tensioner may be of any construction. However, a preferred embodiment is the tensioner disclosed in commonly assigned U.S. Pat. No. 4,473,362, the disclosure of which is hereby incorporated by reference into the present specification. As shown, the tensioner 42 includes an idler pulley 44 which is disposed in rolling engagement with the flat back surface of the belt 20, the pulley being spring biased to maintain a generally constant tension in the belt 20.

The present invention is more particularly concerned with the functional connection between the pulley, generally indicated at 26, and the shaft 36 of the alternator. As best shown in FIG. 2, the alternator includes a housing 46 within which an armature assembly, generally indicated at 48, is journalled, as by bearings 50. As shown, shaft 36 forms a part of the armature assembly 48 and includes an end portion extending outwardly of the housing 46.

Fixed to the outwardly extending end of the shaft 36 is a hub structure, generally indicated at 52. As shown, the hub structure 52 includes a sleeve portion 54 which extends over the end of the shaft end portion 36. As shown, the extremity of the shaft 36 is threaded as indicated at 56 and the sleeve portion 54 is formed with interior threads 58 which are disposed in meshing relation with the threads on the end of the shaft 36. The hub structure also includes an end wall portion 60 on the sleeve portion 54 which is formed with a hexagonal socket 62 for the purpose of receiving a tool for threadedly engaging the sleeve portion 54 on the shaft threads 56. It can be seen that as the sleeve portion 54 is threaded on the end of the shaft 36, the end surface thereof squeezed one side of the inner race of the ball bearing 50 against a flange 64 on the shaft 36 and the other side of the inner race of the ball bearing 50 with the inner race of a ball bearing 66 mounted on the shaft 36 in abutting relation with the ball bearing 50.

As best shown in FIG. 2, the pulley 26 includes an annular pulley member 68 having an exterior centrally located poly-V surface 70 for rollingly engaging the operative poly-V side of the serpentine belt 20. The annular pulley member 68 has axial flanges 72 and 74 at opposite ends thereof, the flange 72 having an interior annular bearing surface which is disposed in engagement with the outer race of ball bearing 66. The opposite flange 74 is exteriorly grooved to receive, as by a force fit, an outer annular wall 76 of a cover member 78 forming a part of the pulley 26. The cover member 78 includes a radial wall 80 extending inwardly from the end of the outer wall 76 and an inner wall 82 extending axially from the lower periphery of the radial wall 80. The inner wall 82 has an interior bearing surface which engages the outer race of a ball bearing 84, the inner race of which fits within an exterior groove in the end wall portion 60 of the hub structure 52.

It can be seen that the mounting of the pulley 26 with respect to the hub structure 52 is such as to define an annular space 86 between the pulley and hub structure. In accordance with the principles of the present invention, the pulley 26 is connected with the hub structure 52 by a generally helical coil spring 88 which is mounted within the space. As shown, the coil spring 88 has one end bent radially outwardly, as indicated at 90, and this end extends within a notch 92 formed in the flange 74 of the annular pulley member 68. The opposite end of the coil spring is bent to extend radially inwardly, as indicated at 94, and this end is engaged within a notch 96 formed in the associated end of the sleeve portion 54 of the hub structure 52. In this way, the pulley 26 is connected to the hub structure 52 by the coil spring 88. Whenever there is a positive torque transmitted by the belt 20 to the pulley 26, the rotational movement of the pulley 26 will be imparted to the hub structure 52 and, hence, the entire armature assembly 48 of the alternator, through the coil spring 88. The resiliency of the coil spring 88 enables the alternator armature assembly 48 under these circumstances to have instantaneous rotational movements with respect to the pulley 26 so as to accommodate the high inertia characteristics of the alternator armature assembly 48. Similarly, where negative torques are imparted to the pulley 26 by the belt 20, instantaneous relative motion of the alternator armature assembly 48 with respect to the pulley 26 is accommodated so that any tendency for the belt 20 to slip with respect to the pulley 26 due to changes in torque in the belt 20 and the high inertia of the alternator armature assembly 48 are generally accommodated so as to minimize belt slippage.

It will be understood that the characteristics of the coil spring 88 are tuned to the particular drive system and more particularly to the particular characteristic of the engine of the drive system. The strength of the spring is determined by diameter dimension of the steel wire utilized to form the coil. Proper tuning is determined by the spring rate which is a function of the number of turns or volutes included between the spring ends 90 and 94.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A serpentine belt drive system for an automotive vehicle comprising
a drive assembly including an internal combustion engine having an output shaft with a driving pulley thereon rotatable about a driving pulley axis, a sequence of driven assemblies each having a driven pulley rotatable about an axis parallel with said driving pulley axis and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley,
said sequence of driven assemblies including an alternator assembly including a housing and an armature assembly mounted in said housing for rotation about an armature axis,
a hub structure fixedly carried by said armature assembly outwardly of said housing for rotation therewith about the armature axis,
means for mounting the driven alternator pulley of said alternator assembly on said hub structure for rotational movement with respect to said hub structure about the armature axis, and
a coil spring between said alternator pulley and said hub structure for transmitting the driven rotational movements of said alternator pulley by said serpentine belt to said hub structure such that said armature assembly is rotated in the same direction as said alternator pulley while being capable of instantaneous relative resilient rotational movements in opposite directions with respect to said alternator pulley during the driven rotational movement thereof.

2. A serpentine belt system as defined in claim 1 wherein said armature assembly includes a shaft having an end portion extending outwardly of said housing and fixed to said hub structure, said serpentine belt being relatively thin and flexible and including an operative side of poly-V cross-sectional configuration and an opposite flat side, said driven alternator assembly being disposed in sequence after an automatic belt tensioner assembly including a belt driven tensioner pulley having a smooth exterior periphery disposed in cooperating relation with the flat side of said serpentine belt.

3. A serpentine belt system as defined in claim 2 wherein said coil spring includes a generally helical coil of spring steel having opposite ends fixed respectively with said alternator pulley and said hub structure.

4. A serpentine belt system as defined in claim 3 wherein said hub structure includes a sleeve portion threaded on and extending over the end portion of said armature shaft having a notch formed in an end thereof for fixedly receiving a radially inwardly directed end of the coil spring.

5. A serpentine belt system as defined in claim 4 wherein said alternator pulley includes an annular pulley member having an exterior poly-V surface for engagement by the operative side of said serpentine belt, and an axial flange at one side thereof provided with an interior annular bearing surface, said armature pulley mounting means including a ball bearing engaging the interior annular bearing surface of the axial flange of said annular pulley member.

6. A serpentine belt system as defined in claim 5 wherein said annular pulley member includes an opposite axially extending annular flange at the opposite end thereof, said opposite axial flange having a notch formed therein fixedly receiving a radially outwardly directed end of said coil spring therein.

7. A serpentine belt system as defined in claim 6 wherein said pulley includes an annular cover member fixed over said opposite axial annular flange and extending inwardly in enclosing relation with the adjacent end of said coil spring.

8. A serpentine belt system as defined in claim 7 wherein said armature pulley mounting means includes a ball bearing between said hub structure and said cover member.

9. A serpentine belt system as defined in claim 1 wherein said alternator pulley includes an annular pulley member having an axially extending annular flange at one end thereof, said axial annular flange having a notch formed therein, said coil spring having an end extending radially outwardly into said notch.

10. A serpentine belt system as defined in claim 9 wherein said alternator pulley also includes an annular cover member fixed over said axial annular flange and extending inwardly in enclosing relation with the adjacent end of said coil spring.

11. An alternator assembly for a serpentine drive system including a serpentine belt comprising
a housing,
an armature assembly mounted in said housing for rotation about an armature axis,
a hub structure carried by said armature assembly outwardly of said housing for rotation therewith about the armature axis,
an alternator pulley mounted on said hub structure for rotational movement with respect to said hub structure about the armature axis,
said pulley having an exterior surface configuration suitable to be engaged by the serpentine belt so as to be driven rotationally thereby, and
a coil spring between said alternator pulley and said hub structure for transmitting the driven rotational movements of said alternator pulley by said serpentine belt to said hub structure such that said armature assembly is rotated in the same direction as said alternator pulley while being capable of instantaneous relative resilient rotational movements in opposite directions with respect to said alternator pulley during the driven rotational movement thereof.

* * * * *